United States Patent [19]

Bailey et al.

[11] Patent Number: 5,023,429
[45] Date of Patent: Jun. 11, 1991

[54] VESSEL AND METHOD FOR THERMALLY PROCESSING BULK MATERIAL

[75] Inventors: Richard G. Bailey, Overland Park, Kans.; Merton R. Leggott, Lincoln, Nebr.

[73] Assignee: Flakee Mills, Inc., Lincoln, Nebr.

[21] Appl. No.: 420,030

[22] Filed: Oct. 11, 1989

[51] Int. Cl.5 .................... F27B 9/06; F27D 11/02
[52] U.S. Cl. ................................ 219/388; 34/203
[58] Field of Search ............ 219/388, 407; 34/203, 34/208

[56] References Cited

U.S. PATENT DOCUMENTS

| | | | |
|---|---|---|---|
| 1,252,813 | 1/1918 | Kochendorfer | 219/407 |
| 1,736,980 | 11/1929 | Panzireff | 34/208 |
| 1,787,063 | 12/1930 | Cano | 34/208 |
| 2,093,061 | 9/1937 | Wallace | 34/208 |
| 2,505,117 | 4/1950 | Hoffmann | 219/407 |
| 3,770,408 | 11/1973 | McCully | 219/400 |
| 4,366,628 | 1/1983 | George | 34/208 |

*Primary Examiner*—Teresa J. Walberg
*Attorney, Agent, or Firm*—Litman, McMahon & Brown

[57] ABSTRACT

A vessel for thermally processing bulk material includes a housing system with a cabinet forming an interior. A conveying system is provided for conveying the bulk material through the housing cabinet interior. The cabinet includes composite panels with heating elements located therein. The housing input may include a flow control assembly with a hinged flap depending from a vertical panel.

7 Claims, 2 Drawing Sheets

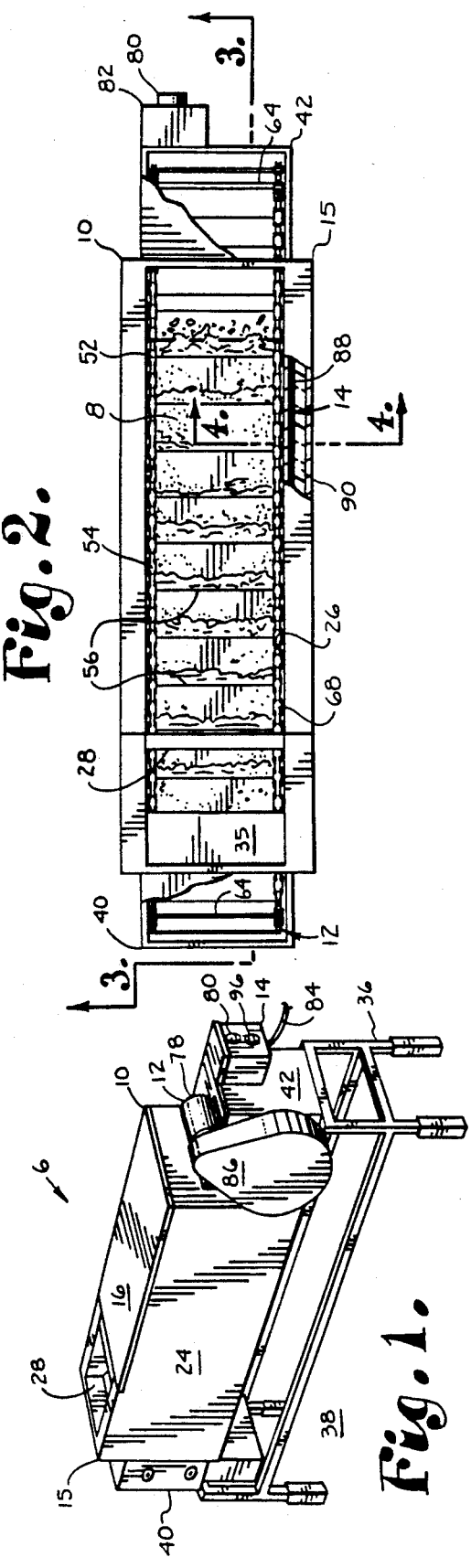
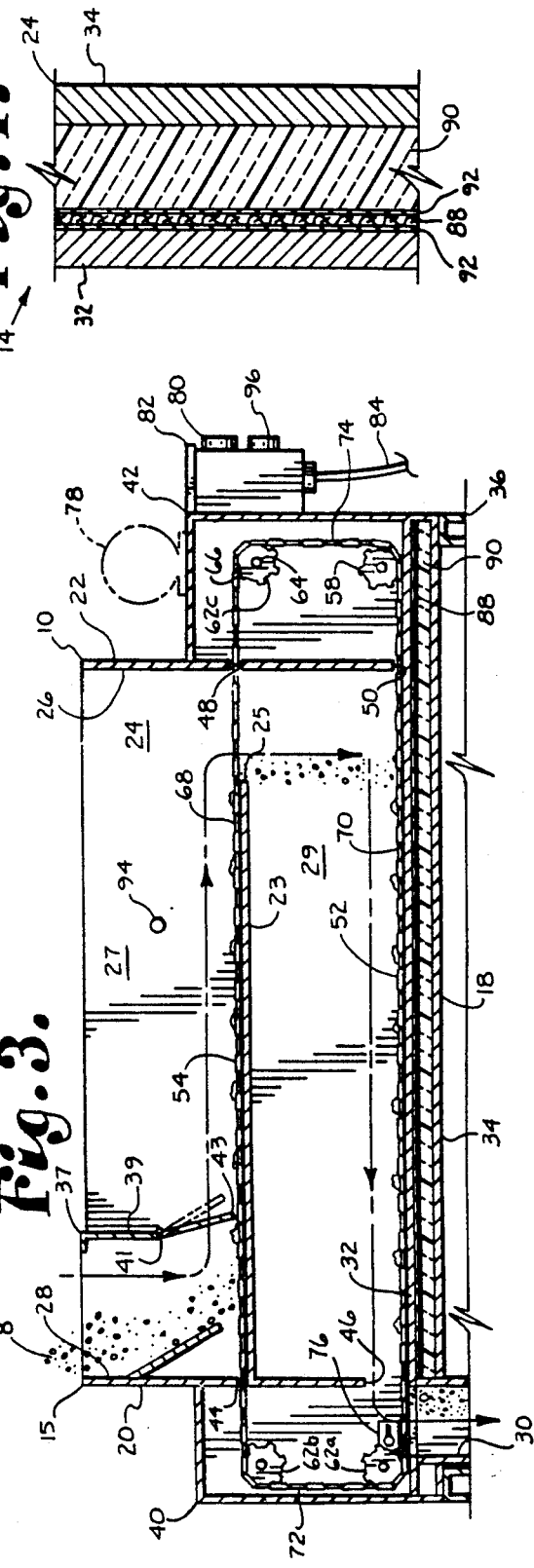

VESSEL AND METHOD FOR THERMALLY PROCESSING BULK MATERIAL

BACKGROUND OF THE INVENTION

1. Field of the Invention

The present invention relates generally to bulk material processing and handling, and in particular to a vessel and method for bulk material heat retention.

2. Description of the Relevant Art

Various bulk materials are commonly processed in heating and cooking equipment. For example, food for human consumption and feed for animal consumption are commonly cooked to improve digestability and to retard spoilage.

Various grains which are commonly used in food and feed products contain enzymes and bacteria which, if untreated, can cause rancidity. For example, oat groats include peroxydase and lipase enzymes which can be neutralized with heat to prolong shelf life. Soybeans also require cooking for maximum nutritional value and resistance to spoilage. Starch grains such as wheat and cornmeal can be processed with heat to gelatinize their starches for greater nutritional value and digestability, and for longer shelf life.

Food and feed materials can be cooked with various types of equipment, such as extruders and infrared processors. Exemplary infrared processors are shown in our co-pending U.S. Patent Applications Ser. No. 283,238 and Ser. No. 399,258. Bulk materials are cooked in such devices by steam injection, mechanical shear action, infrared radiation and other means. When the materials are discharged from such equipment they are typically at elevated temperatures and susceptible to rapid cooling if exposed to the ambient atmosphere. Since it is often desirable to maintain such materials at their elevated temperatures, heat retention devices have heretofore been proposed. Steam jackets have been used on such previous heat retention vessels, but are generally limited to operation at the practical, maximum working temperature of steam, which is approximately two hundred and twelve degrees Fahrenheit at sea level.

Heretofore there has not been available a vessel and method for processing bulk material with the advantages and features of the present invention.

SUMMARY OF THE INVENTION

In the practice of the present invention, a vessel is provided for thermally processing a bulk material. The vessel includes an insulated housing which encloses an interior. Upper and lower material slide panels are provided in the housing. A drag conveyor is located in the housing interior and includes upper and lower runs across the upper and lower material slide panels respectively. The housing includes side panels with radiant, infrared, electrical resistance heating material therein.

Objects and Advantages of the Invention

The principal objects and advantages of the present invention include: providing a vessel for thermally processing bulk material; providing such a vessel which utilizes infrared heat; providing such a vessel which is adapted for maintaining relatively high temperatures in the bulk material; providing such a vessel which is adapted for processing various bulk materials; providing such a vessel which is adapted for processing various food and feed material ingredients; providing such a vessel which is adapted for improving the digestability of various food and feed materials; providing such a vessel which is adapted for prolonging the shelf lives of various food and feed materials; providing such a vessel which is adapted for gelatinizing the starches in various starch grains; and providing such a vessel which is economical to construct, efficient in operation, capable of a long operating life and particularly well adapted for the proposed usage thereof; providing a method for thermally processing bulk material; providing such a method which is applicable to various food and feed materials; providing such a method which is relatively efficient; and providing such a method which improves digestability and lengthens the shelf lives of various food and feed materials.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a vessel for thermally processing bulk material embodying the present invention.

FIG. 2 is a top plan view thereof.

FIG. 3 is a longitudinal, vertical, cross-sectional view thereof taken generally along line 3—3 in FIG. 2.

FIG. 4 is an enlarged, fragmentary, cross-sectional view thereof taken generally along line 4—4 in FIG. 3.

DETAILED DESCRIPTION OF THE PREFERRED EMBODIMENT

I. Introduction and Environment

Figure 5:
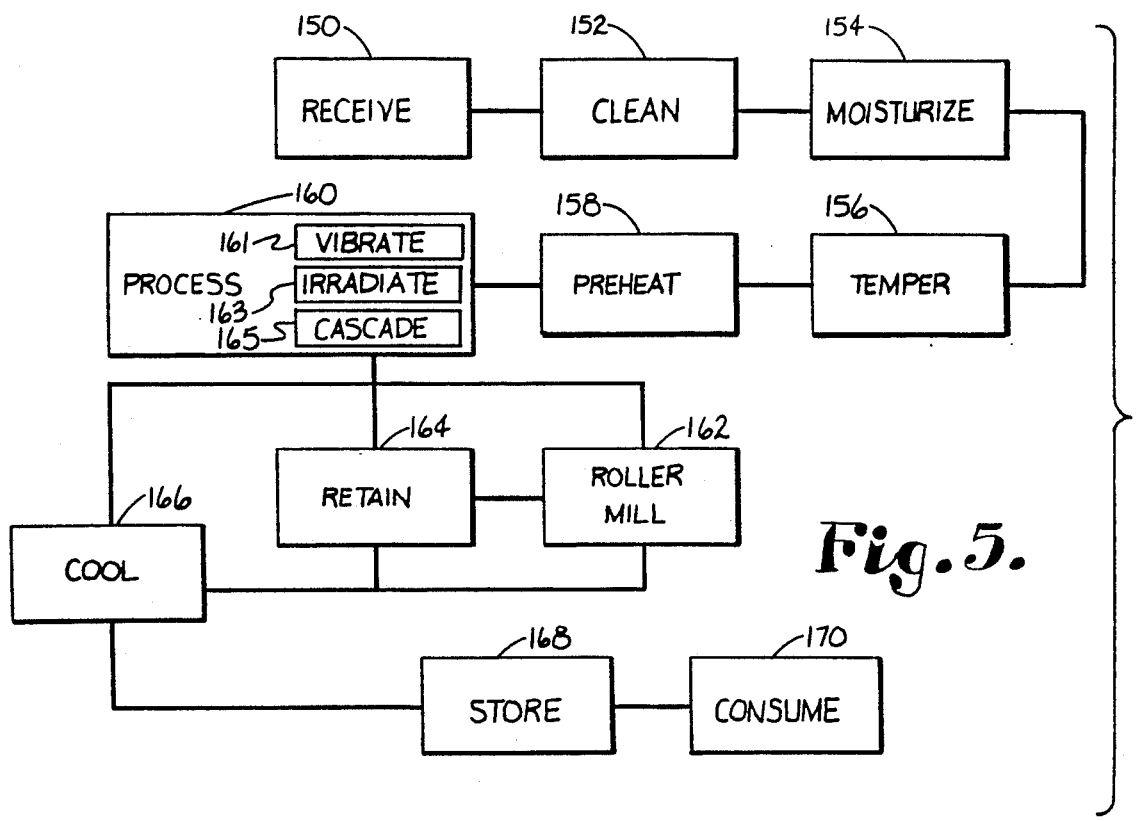
FIG. 5 is a schematic diagram of a method for thermally processing bulk material embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure being referred to. Said terminology will include the words specifically mentioned, derivatives thereof and words of similar import.

Referring to the drawings in more detail, reference numeral 6 generally designates a vessel for thermally processing bulk material 8. The vessel 6 generally comprises a housing 10, a conveying system 12 and a heating system 14.

II. Housing 10

The housing 10 includes a cabinet having top and bottom panels 16, 18, front and back panels 20, 22 and opposite side panels 24 defining an interior 26. An inlet opening 28 is formed in the top panel 16 adjacent to the front panel 20 and an outlet opening 30 is formed in the bottom panel 18 adjacent to the front panel 20. The top, front and back panels 16, 20 and 22 can comprise, for example, a single thickness of sheet metal. The top panel 16 is preferably flanged and removable for access to the interior 26. The bottom and side panels 16, 24 each comprises inner and outer sheet metal skins or layers 32, 34.

A generally horizontal, upper, material slide panel 23 extends rearwardly from the front panel 20 in parallel, spaced relation between the top and bottom panels 16, 18 and terminating at a rear edge 25 in spaced relation from the back panel 22. The upper material slide panel 23 divides the cabinet interior 26 into upper and lower compartments 27, 29 which are open to each other through an interior material drop opening 31 between the back panel 22 and the upper material slide panel rear edge 25. The housing system 10 includes a support frame 36 for mounting the cabinet 15 in spaced relation above a floor surface 38. The cabinet 15 includes front and back conveyor return compartments 40, 42. The front conveyor return compartment 40 is open to the cabinet interior 26 through front upper and lower conveyor belt passages or slots 44, 46. The back conveyor return compartment 42 is open to the cabinet interior 26 through back upper and lower belt passages or slots 48, 50. The front lower passage 46 preferably has greater height for passing quantities of bulk material 8 therethrough, as compared to the other belt passages 44, 48, 50.

A deflector panel 35 projects downwardly and rearwardly from the front panel 20 below the inlet opening 28 and extends transversely across substantially the entire width of the cabinet 15. A flow level control assembly 37 includes a proximate, vertical panel 39 which extends through the top panel 16 in front of the inlet opening 28 and is vertically slidably adjustable. The vertical panel 39 includes a lower edge 41 hingedly mounting a flap 43.

III. Conveying System 12

The conveying system 12 includes an endless belt-type drag chain assembly 52 including a pair of endless chains 54 extending in generally rectangular configurations adjacent to the side panels 24 within the cabinet interior 26. A plurality of drag paddles or crossbars 56 extend transversely between the drag chains 54 at spaced intervals of, for example, six inches on centers. A drive axle-and-sprocket subassembly 58 extends transversely through the back conveyor return compartment 42 in proximity to the bottom panel 18. Idler axle and sprocket subassemblies 62a, 62b and 62c extend transversely across the front and rear conveyor return compartments 40, 42. Each axle-and-sprocket subassembly 58, 62a-62c includes an idler axle 64 rotatably mounting a pair of idler sprockets 66. Each drag chain 54 is reeved over a set of four sprockets 60, 66 adjacent to a respective side panel 24 whereby a generally rectangular (when viewed from the side) configuration of the belt assembly 52 is formed and includes an upper run 68 over the upper material slide panel 23. A bottom run 70 of the drag chain belt assembly 52 extends along and on top of the bottom or lower material slide panel 18 and front and back runs 72, 74 extend in the front and back conveyor return compartments 40, 42 respectively.

Takeup assemblies 76 are provided on the lower, front idler axle and sprocket 62a and are adapted for adjusting the slack and tension in the drag chain belt assembly 52. A motor or prime mover 78 is mounted on top of the back conveyor return compartment 42 and can be controlled by a suitable speed control device, such as the potentiometer 80 shown mounted on an electrical control box 82 receiving a power supply line 84. The motor 78 can be connected to the drive axle 58 by any suitable mechanical drive train system enclosed within the safety guard housing 86, such as a chain-and-sprocket mechanism, a belt-and-pulley mechanism, a gear train, etc. Such devices can provide for altering the speed of the drag chain belt assembly 52 by changing engaged gears, sprockets or pulleys. Alternatively or in combination with such mechanical means for varying the speed of the drag chain belt assembly 52, the motor 78 can be variable speed. For example, motors operating on direct electrical current are often used where speed variation is desirable.

IV. Heating System 14

The heating system 14 generally includes planar, sheet-like, electrical-resistance heating elements 88 located in the side panels 24 and the bottom panel 18. Without limitation on the generality of useful heating elements, "Flex-Heat" radiant ceiling heating systems available from Thermofilm Corporation, Concord, Ontario can be employed with the present invention for radiating heat in the infrared range. Such Flex-Heat elements comprise fiberglass cloth impregnated with chemical formulas to control electrical conductivity and radiant heat output.

The heated panels 18, 24 include internal thermal insulation layers 90 comprising any suitable insulation material, e.g. cloth, batting, fiberglass, etc., positioned against their outer skins 34. Electrical insulation layers 92 are placed on both sides of the heating elements 88, i.e. against the thermal insulation layer 90 and against the inner skin 32. Such insulation layers can comprise, for example, "Kevlar" aromatic polyamide fiber or "Caproland" polyamide fiber, and can be relatively thin, e.g. only about three thirty-seconds to one-eighth of an inch thick. A temperature probe 94 is located in the interior 26 for providing a signal corresponding to the temperature in the interior 26. The temperature probe 94 can be connected to a thermostat 96 for setting a desired temperature in the interior 26.

V. Operation

FIG. 5 shows a bulk material processing method as disclosed in our co-pending U.S. Patent Application Ser. No. 399,258, which is incorporated herein by reference. The method is adapted for processing a bulk material, such as starch grains, oats or soybeans, to a finished food or feed material product. Such a method can include, for example, the steps of: receiving 150, cleaning 152, moisturizing 154, tempering 156, preheating 158, processing 160 (including vibrating 161, irradiating 163 and cascading 165), roller milling 162, retaining (e.g. in the vessel 6) 164, cooling 166, storing 168 and consuming 170.

In such a process, the vessel 6 can operate to retain the heat and prolong the cooking of a material received from, for example, an infrared cooking device, a micronizing device, an extruder, etc. In processing many types of material it may be desirable to prolong the elevated temperature cycle in this manner so that the cooking process can continue. The length of the process time temperature through the vessel 6 can depend on variables such as the specific material involved, its input temperature, the desired process, etc. For example, beneficial results can be achieved by processing oat groats in the vessel 6 for approximately eight minutes at a temperature in the range of about two hundred and twelve degrees Fahrenheit to two hundred and twenty degrees Fahrenheit. Such processing tend to destroy or control proxydase and lipase enzymes. Rancidity is thus inhibited in the finished product and shelf life is prolonged. Soybeans can be processed for approximately two to three minutes at two hundred and fifty degrees for beneficial results. The cycle time can be controlled with the speed control for the drag chain belt assembly 52. The output of the heating elements 88 can be in the infrared range. Alternatively, other wave ranges could be successfully employed, e.g. ultraviolet, etc. The heating elements 88 described above can reach temperatures of approximately three hundred and fifty degrees Fahrenheit. Thus, operating temperatures within the interior 26 over a wide temperature range below three hundred and fifty degrees Fahrenheit are feasible.

It is to be understood that while certain forms of the present invention have been illustrated and described herein, it is not to be limited to the specific forms or arrangement of parts described and shown.

What is claimed and desired to be secured by letters patent is as follows:

1. A vessel for bulk material processing, which includes:
   (a) a housing defining a housing interior and having inlet and outlet openings to said housing interior;
   (b) said housing having a pair of opposite side walls with inner and outer skins and a layer of insulation positioned therebetween;
   (c) a pair of layers of heat-producing material each positioned between a respective inner skin and a respective insulation layer;
   (d) an endless belt, drag link conveyor positioned within said housing interior and extending between said inlet and outlet openings;
   (e) a motor drivingly connected to said conveyor; and
   (f) a flow control assembly including a vertical panel slidably extending through said top panel and terminating at a lower edge positioned within said upper compartment and a flap hingedly mounted on said panel lower edge and depending generally downwardly therefrom.

2. The vessel according to claim 1 wherein:
   (a) said heat-producing material comprises fiberglass cloth impregnated with electrical conduction means.

3. The vessel according to claim 1, which includes:
   (a) an upper horizontal material slide panel positioned within said interior below said inlet opening;
   (b) a lower material slide panel positioned within said vessel interior adjacent to said outlet opening;
   (c) said drag conveyor including an upper run over said upper material slide panel and a lower run over said lower material slide panel; and
   (d) a material flow path from said inlet opening to said upper material slide panel, along said upper material slide panel, a drop to said second material slide panel and along said second material slide panel to said outlet opening.

4. The vessel according to claim 1, which includes:
   (a) said conveyor being driven by a variable speed motor.

5. A vessel for bulk material processing, which includes;
   (a) a housing having:
      (1) top, bottom, front, back and opposite side panels;
      (2) an interior enclosed by said panels;
      (3) an upper material slide panel extending rearwardly from said front panel in parallel, spaced relation between said top and bottom panels, said upper material slide panel terminating at a rear edge in spaced relation in front of said back panel;
      (4) a material drop opening formed between said upper material slide panel rear edge and said back panel;
      (5) an inlet opening in said top panel adjacent to said front panel;
      (6) an outlet opening in said bottom panel adjacent to said front panel;
      (7) upper and lower compartments formed within said cabinet interior and demarcated by said upper material slide panel;
      (8) a substantially enclosed front conveyor return compartment mounted on said front panel and separate from said housing interior;
      (9) a substantially enclosed back conveyor return compartment mounted on said back panel and separate from said housing interiors; and
      (10) each said front and back panel having upper and lower belt passages therethrough communicating said cabinet interior with said front and back conveyor return compartments respectively;
   (b) a conveying system including:
      (1) a drive axle-and-sprocket subassembly mounted and extending transversely across said back conveyor return compartment;
      (2) an idler axle-and-sprocket subassembly mounted in said back conveyor return compartment and extending transversely thereacross;
      (3) a pair of idler axle-and-sprocket subassemblies mounted in and extending transversely across said front conveyor return compartment;
      (4) each said axle-and-sprocket subassembly including a transverse axle mounting a pair of sprockets;
      (5) a drag chain belt assembly including a pair of chains each reeved over a set of sprockets adjacent a respective side of said vessel and a plurality of transverse drag panels extending between said chains in spaced relation;
      (6) said drag chain belt assembly having an upper run extending along and on top of said upper material slide panel and a lower run extending along and on top of said bottom panel; and
      (7) a variable speed motor drivingly connected to said drive axle-and-sprocket subassembly; and
   (c) a heating system including:
      (1) a bottom heating element and a pair of side heating elements mounted in said bottom and side panels between said inner and outer skins respectively;

(2) each said heating element comprising a cloth-like material adapted for producing infrared radiation in response to a flow of electrical current therethrough;

(3) thermal insulation layers positioned between said heating elements and respective panel outer skins;

(4) electrical insulation layers positioned on both sides of said heating elements;

(5) a temperature probe positioned in said cabinet interior; and (6) temperature control means connected to said temperature probe and adapted for controlling electrical power applied to said heating elements whereby a predetermined temperature range can be approximately maintained within said interior.

6. The vessel according to claim 5, which includes:

(a) a flow level control assembly including a vertical panel slidably extending through said top panel and terminating at a lower edge positioned within said upper compartment and a flap hingedly mounted on said panel lower edge and depending generally downwardly therefrom.

7. A vessel for bulk material processing, which includes:

(a) a housing having:

(1) top, bottom, front, back and opposite side panels;

(2) an interior enclosed by said panels;

(3) an upper material slide panel extending rearwardly from said front panel in parallel, spaced relation between said top and bottom panels, said upper material slide panel terminating at a rear edge in spaced relation in front of said back panel;

(4) a material drop opening formed between said upper material slide panel rear edge and said back panel;

(5) an inlet opening in said top panel adjacent to said front panel;

(6) an outlet opening in said bottom panel adjacent to said front panel;

(7) upper and lower compartments formed within said cabinet interior and demarcated by said upper material slide panel;

(8) a front conveyor return compartment mounted on said front panel;

(9) a front conveyor return compartment mounted on said back panel; and

(10) each said front and back panel having upper and lower belt passages therethrough communicating said cabinet interior with said front and back conveyor return compartments respectively;

(b) a conveying system including:

(1) a drive axle-and-sprocket subassembly mounted and extending transversely across said back conveyor return compartment;

(2) an idler axle-and-sprocket subassembly mounted in said back conveyor return compartment and extending transversely thereacross;

(3) a pair of idler axle-and-sprocket subassemblies mounted in and extending transversely across said front conveyor return compartment;

(4) each said axle-and-sprocket subassembly including a transverse axle mounting a pair of sprockets;

(5) a drag chain belt assembly including a pair of chains each reeved over a set of sprockets adjacent a respective side of said vessel and a plurality of transverse drag panels extending between said chains in spaced relation;

(6) said drag chain belt assembly having an upper run extending along and on top of said upper material slide panel and a lower run extending along and on top of said bottom panel; and (7) a variable speed motor drivingly connected to said drive axle-and-sprocket subassembly; and (c) a heating system including:

(1) a bottom heating element and a pair of side heating elements mounted in said bottom and side panels between said inner and outer skins respectively;

(2) each said heating element comprising a cloth-like material adapted for producing infrared radiation in response to a flow of electrical current therethrough;

(3) thermal insulation layers positioned between said heating elements and respective panel outer skins;

(4) electrical insulation layers positioned on both sides of said heating elements;

(5) a temperature probe positioned in said cabinet interior; and (6) temperature control means connected to said temperature probe and adapted for controlling electrical power applied to said heating elements whereby a predetermined temperature range can be approximately maintained within said interior; and (d) a flow level control assembly including a vertical panel slidably extending through said top panel and terminating at a lower edge positioned within said upper compartment and a flap hingedly mounted on said panel lower edge and depending generally downwardly therefrom.

* * * * *